United States Patent Office 3,144,465
Patented Aug. 11, 1964

3,144,465
INTERNAL KETALS FROM DIHYDRO-GAMMA-IONONE, DIHYDRO-GAMMA-IRONE AND 5,5,9-TRIMETHYL - 2 - METHYLENE - 1 - (3' - OXO-BUTYL-1')-DECAHYDRONAPHTHALENE
Leopold Ruzicka and Oskar Jeger, Zurich, Switzerland, assignors to Firmenich et Cie, Geneva, Switzerland
No Drawing. Filed July 24, 1961, Ser. No. 125,977
Claims priority, application Switzerland Jan. 12, 1961
9 Claims. (Cl. 260—340.9)

This application relates to the production of new polycyclic internal ketals, and includes the new products and methods of producing them.

This application is a continuation-in-part of our copending application Serial Number 340,158, filed March 3, 1953.

Very little is known about the unsaturated ketones and aldehydes of the general Formula I which have their double bond at the $\delta,\epsilon$ position with respect to the carbonyl group, and even less is known about the corresponding $\delta,\epsilon$-hydroxy-carbonyl compounds of the general Formula II.

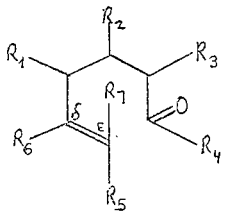
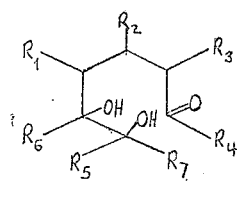

I
II

In these formulae $R_1$, $R_2$, $R_3$, $R_4$, $R_5$, $R_6$, and $R_7$ may be hydrogen atoms or hydrocarbon radicals. When $R_4$ is hydrogen the compounds are aldehydes; when $R_4$ is a hydrocarbon radical the compounds are ketones. In the aliphatic series, there is only one $\delta,\epsilon$ dihydroxy-aldehyde to be found in the literature, which has been synthetized by Prileshajew (C 1912$^{II}$, 2092), starting from citral; but even here, the exact position of the hydroxyl groups has not been quite ascertained.

Some recent papers have thrown more light on this subject. Three specific $\delta,\epsilon$ unsaturated ketones have been synthetized: dihydro-γ-ionone (Formula III), dihydro-γ-irone (Formula IV) and a $C_{18}$ ketone (Formula V) from manool, which may be called 5,5,9-trimethyl-2-methylene-1-(3'-oxo-butyl-1')-decahydronaphthalene.

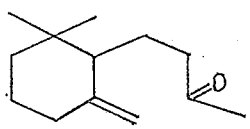

III

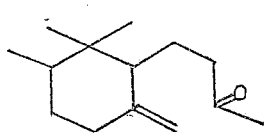

IV

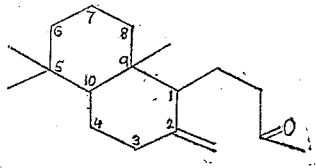

V

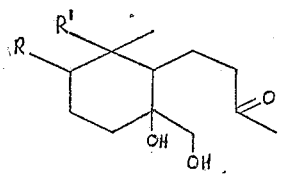

VI

Now it has been tried to make the corresponding $\delta,\epsilon$ dihydroxy derivatives (Formula VI, wherein R and $R^1$ are hydrogen atoms or lower alkyl radicals, or together represent a 1,1-dimethyl-butylene-1,4 radical) of the above mentioned ketones of Formulae III, IV and V through the action of specific reagents such as $OsO_4$, $KMnO_4$, etc., which are known as being able to add two hydroxylic groups at the double bond. According to what was known before, one could definitely expect to get these dihydroxy derivatives of Formula VI quite normally. But, surprisingly enough, instead of this the main product of the reaction starting from monocyclic ketones like dihydro-γ-ionone or dihydro-γ-irone as well as from bicyclic compounds like the $C_{18}$ ketone deriving from manool, is always an internal cyclic ketal.

This completely unexpected reaction may thus lead to new substances having the formula of intra-molecular ketals or acetals, all of them unknown hitherto.

Now, it has been found that these substances are of great value for the perfume industry; the odours of the ketals deriving from the dihydro-γ-ionone (Formula III), from the dihydro-γ-irone (Formula IV) and from the $C_{18}$ ketone (Formula V) are all remarkably powerful and lasting, and have completely new notes, which make these bodies very useful for perfume compositions. Besides, these ketals are very stable, even in slightly acidic mediums.

Consequently the present invention relates to new polycyclic internal ketals of the general formula:

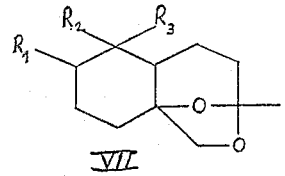

VII wherein $R_1$, $R_2$ and $R_3$ are hydrogen atoms or lower alkyl radicals, or $R_1$ and $R_2$ together represent a 1,1-dimethyl-butylene-1,4 radical.

More specifically, the invention relates to the new internal ketals deriving from the dihydro-γ-ionone, from the dihydro-γ-irone and from the C₁₈ ketone of Formula V. These three new internal ketals have respectively the following formulae:

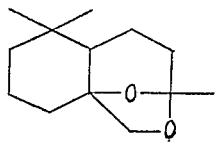
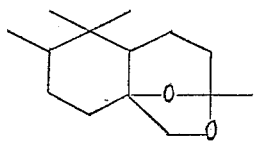

VIII      IX

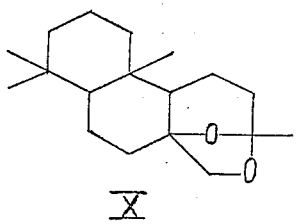

X

A preferred embodiment of the process for preparing the new compounds consists in submitting a δ,ε-unsaturated carbonyl compound of Formulae III, IV, V to the action of an oxidizing reagent known as being able to add two hydroxylic groups at the double bond. Said oxidizing agent may be potassium permanganate, osmium tetroxide and, generally speaking, all reagents which are known as adding or producing two hydroxylic groups at a double bond.

The substance represented by the general Formula X can exist in two stereoisomeric forms XI and XII

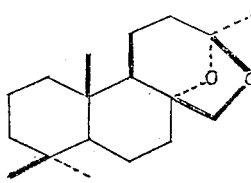
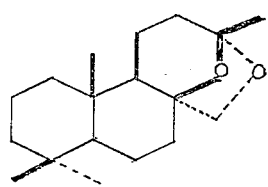

XI      XII

According to the above described process, the isomer XI is obtained at least predominantly.

A mixture of both isomers XI and XII is obtained by a process which comprises subjecting the product of the mono-epoxidation of manool to an oxidation in order to eliminate the vinyl group and convert the hydroxy function to a ketone function, causing the intra-molecular ketalization between the ketone group and the epoxide group of the epoxy-ketone thus formed so as to obtain a mixture of stereoisomeric ketals.

The intra-molecular ketalization of said epoxy-ketone gives rise to the formation of a mixture of stereoisomeric internal ketals which can be separated, e.g., by chromatography on alumina. There are thus obtained the isomers corresponding to the above structural Formulae XI and XII, provided that the starting epoxide is that of naturally occurring manool.

The mono-epoxide XIV used as starting material in this embodiment of the process can be obtained by epoxidation of manool XIII, preferably manool of natural origin, according to the following reaction scheme:

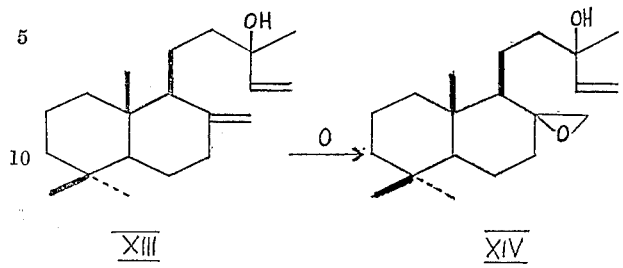

XIII      XIV

The epoxidation can be readily effected with high yields by the action of organic peracids whose corresponding non-peroxidized carboxylic acids have a sufficiently low acidity to prevent the epoxide group of the reaction product from being attacked. For this purpose there can be used, e.g., peracetic, perbenzoic, mono-perphthalic, percamphoric acid, etc. It is also possible to use performic acid, provided, however, that alkali is added to the reaction mixture so as to reduce the acidity. Perbenzoic acid is preferably used. It is advantageous to use the organic peracid in an amount slightly in excess over the theoretical amount required for the mono-epoxidation of manool. Thus, e.g., manool can be reacted with the organic peracid in a molecular ratio of about 1:1.2. Examples of media for the epoxidation reaction are chloroform, diethyl ether, benzene, acetone, dioxan and ethyl chloride. It is advantageous to carry out the epoxidation of manool at a temperature not exceeding 10° C., preferably at a temperature comprised between 0° and 10° C. The epoxide group can occupy two different steric positions so that the mono-epoxide XIV can exist in two stereoisomeric forms. However, it seems that under the above mentioned reaction conditions the epoxidation is stereospecific and that the epoxidation product consists, at least in major amount, of one only of the two possible isomers.

Several methods can be employed for the oxidation of the mono-epoxide XIV. One of these methods consists in subjecting the mono-epoxide of manool to the action of a meta-periodate, e.g., sodium or potassium meta-periodate, in the presence of a hydroxylating agent acting as a promoter or catalyst of the oxidation reaction. Osmium tetroxide or an alkaline permanganate are suitable hydroxylating agents. The hydroxylating agent causes the intermediary formation of an epoxy-triol XV which is immediately oxidized to the epoxy-ketone XVI by the action of the meta-periodate. At the same time the hydroxylating agent is constantly regenerated by the oxidation action of the meta-periodate. The sequence of the reactions can be illustrated by the following scheme:

The oxidation of XIV is conveniently effected in a mixed aqueous-organic solvent, e.g., in a mixture of water and methanol, ethanol, tert.-butanol, acetic acid or dioxan. Aqueous dioxan is preferably used. Since the oxidation reaction is exothermic, it is sufficient to add to the solution of the mono-epoxide XIV the hydroxylating agent and the periodate at room temperature without any heating, the heat evolved in the reaction causing an increase of the temperature of the reaction mixture. However, it may be of advantage to heat the reaction mixture, e.g., to 40° C., to complete the reaction. The hydroxylating agent can be used in relatively small amounts in view of the fact that it is constantly regenerated in the course of the reaction. Thus, e.g., the use of $OsO_4$ in an amount of 0.025 to 0.035 mole per mole of mono-epoxide of manool is sufficient.

Another method which can be used for oxidizing the mono-epoxide XIV consists in subjecting the epoxide to the action of $OsO_4$ to form an osmic complex corresponding to the formula:

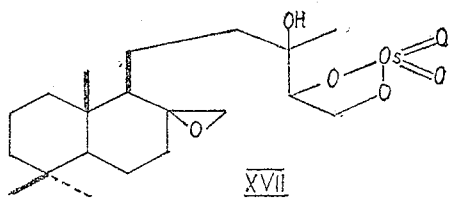

decomposing this complex to obtain the epoxy-triol XV and oxidizing the latter by the action of periodic acid or one of its salts, e.g., sodium periodate. The formation of the osmic complex is preferably carried out in an anhydrous organic medium, e.g., in ether, in the presence of pyridine at room temperature. The decomposition of the osmic complex via formation of the triol XV can be effected by trans-esterification with mannitol in the presence of a base such as caustic soda by heating. According to other methods, the osmic complex can be decomposed by the action of sodium sulfite or bisulfite in an alcoholic medium or by treating with hydrogen sulfide the reaction mixture containing the osmic complex.

The epoxy-triol of Formula XV has two asymmetric carbon atoms in its side chain and can, therefore, exist in two stereoisomeric forms, disregarding the stereoisomery due to the epoxide group.

The conversion of the epoxy-triol XV into epoxy-ketone XVI can be carried out by treating a solution of the epoxy-triol in an organic solvent such as methanol with an aqueous solution of periodic acid or a periodate, e.g., sodium periodate, in the presence of a small amount of pyridine at room temperature.

The oxidation of manool mono-epoxide XIV can also be effected by the action of potassium permanganate in an organic medium, e.g., in acetone, at room temperature. This latter method of oxidation is, however, less advantageous than the previously described methods in view of the fact that it gives smaller yields of epoxy-ketone XVI.

In the following step of the process of the invention, the epoxy-ketone XVI is subjected to an intra-molecular ketalization between the ketone group and the epoxide group. To cause ketalization, the epoxy-ketone can be heated in an organic medium, e.g., in dioxan, benzene, etc., in the presence of an acid catalyst, such as sulfuric acid, boron trifluoride, p-toluene sulfonic acid, etc.

In the preparation of perfume compositions there can be used either the mixture of the two isomers XI and XII or either of the individual stereoisomers alone. The separation of the two isomers can be effected, e.g., by chromatography on alumina by using petroleum ether or a mixture of petroleum ether/benzene as the eluant.

The isoketal XII has a less pronounced absorbability on alumina than the isomeric ketal XI and is, therefore, first eluated. The two ketals are obtained in their pure state by recrystallization, e.g., from hexane.

The following examples illustrate the invention. In these examples the parts indicated are given by weight.

EXAMPLE 1

*Preparation of the Internal Ketal of Formula VIII Deriving From Dihydro-γ-Ionone*

5.82 parts of dihydro-γ-ionone and 5.10 parts $OsO_4$ are dissolved in 71 parts of dry ether. After three days, the ether is distilled off and to the residue are added: 52.4 parts mannite, 15.7 parts KOH, 123 parts benzene, 110 parts alcohol and 140 parts water. The mixture is refluxed for 8 hours. After separation of the acidic fraction from the neutral fraction, the 5.3 parts of the obtained neutral raw fraction are treated with Girard's T reagent, for separating the unreacted ketonic product. The non-ketonic fraction is chromatographed on 120 parts $Al_2O_3$ (activity II). The petroleum ether eluate consists of 3 parts of a colorless oil, boiling at 71–72° under 0.06 mm. Hg, $n_D^{22}$ 1.4799.

The analysis of this oil indicates the formula $C_{13}H_{22}O_2$ corresponding to the desired cyclic ketal of Formula VIII.

The last eluate (petroleum ether-benzene 1:1) contains the hemi-ketal $C_{13}H_{24}O_3$, M.P. 157–158° of Formula XXVII or XXVIII.

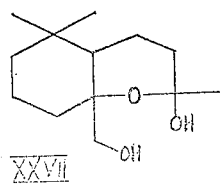 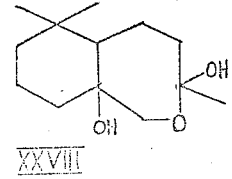

EXAMPLE 2

*Preparation of the Internal Ketal of Formula IX Deriving From Dihydro-γ-Irone*

4.35 parts dihydro-γ-irone (regenerated from the semicarbazone, M.P. 199–200°) and 5.8 parts $OsO_4$ are dissolved in 71 parts dry ether. After three days in the dark, the ether is distilled off. To the remaining black crystals are added: 59.8 parts mannite, 17.8 parts KOH, 140 parts benzene, 126 parts alcohol and 160 parts water. The mixture is refluxed for 5 hours and treated as in Example 1. The obtained neutral raw fraction (4.18 parts) is heated with Girard's T reagent. 3.52 parts fail to react with it and are chromatographed on 100 parts $Al_2O_3$ (activity II, neutral). The petroleum ether eluate consists of 2.31 parts of crystals, M.P. 59–60° (constant M.P. 62.5°, after three recrystallizations from $CH_3OH$); the analysis indicates for them the formula $C_{14}H_{24}O_2$, consistent with the cyclic ketal wanted of Formula IX.

EXAMPLE 3

*Preparation of the Internal Ketal of Formula X Deriving From the $C_{18}$ Ketone of Formula V*

Two parts of the said pure $C_{18}$ ketone (isolated from the products of the oxidation of manool by $KMnO_4$) are treated with 2.05 parts $OsO_4$ in 35 parts dry ether. After 3½ days the ether is evaporated. To the residue are added: 20 parts mannite, 6 parts KOH, 50 parts water, 40 parts alcohol and 45 parts benzene. After separation of the acidic fraction and of the unreacted ketonic fraction, 2.10 parts intensely smelling crystals are isolated. After purification they melt at 117°. Their analysis gives the formula $C_{18}H_{30}O_2$ corresponding to the polycyclic ketal wanted of Formula X.

EXAMPLE 4

*Preparation of the Same Ketal as in Example 3, But Starting From Manool Without Isolating the $C_{18}$ Ketone*

To 31.5 parts manool dissolved in 1200 parts acetone, 57 parts $KMnO_4$ are added in 9 hours, the temperature being maintained at 2–4°. After standing over night, the $MnO_2$ formed is eliminated and the remaining solution is separated into 8.5 parts of an acidic fraction (partially crystallized) and 21.4 parts of a neutral fraction. The neutral fraction is treated twice with Girard's T reagent and separated into 9.8 parts ketonic products and 10.35 parts non-ketonic material. 3.15 parts of this non-ketonic material are chromatographed on 80 parts $Al_2O_3$ (activity II) and the following products are obtained:

A. The petroleum ether eluates, 1.353 parts, M.P. 105–107°
B. The petroleum ether and benzene 1:1 eluates, 0.023 part, oily
C. The petroleum ether and benzene 1:1 eluates, 1.618 parts, M.P. 44–46°.

The C fraction consists of non-reacted manool.

The A fraction is recrystallized and melts at 117°; D= +28° (c.=0.95). The formula is $C_{18}H_{30}O_2$, corresponding to the desired ketal of Formula X. At least the major part consists of the isomer XI.

EXAMPLE 5

The manool mono-epoxide to be used as starting material can be obtained in the following manner:

29 g. (100 millimoles) of manool of natural origin or obtained from sclareol according to G. Ohloff, Helv. Chim. Acta, 41, 845 (1958), are dissolved in 400 ml. of chloroform, and the solution is put in a three-neck flask equipped with a thermometer, a mechanical agitator and a decanting means. The apparatus is placed in a cold room and the decanting means filled with a solution of 16.6 g. (121 millimoles) of perbenzoic acid in 245 ml. of chloroform. The whole is permitted to come to equilibrium at the temperature of the cold room (+5° to +9° C.), then the peracid is introduced into the stirred manool solution within 18 to 20 hours. After that time a slight excess over 1 equivalent of perbenzoic acid (1.05 to 1.1 eq.) has been absorbed.

The chloroform solution is washed three times with 10% sodium carbonate, three times with 2% caustic soda and finally with water until neutral. The solution is concentrated on the water bath while care is being taken not to allow the concentration to proceed to dryness. The concentration is completed in vacuo and then in a high vacuum. There are thus obtained 32.7 g. of crude mono-epoxide in the form of a yellow and turbid viscous oil. In order to obtain the mono-epoxide in its pure form, the crude product is distilled in a high vacuum in a wide-mouthed flask. There are obtained 29.4 g. (96%) of purified mono-epoxide, $B.P._{0.001}$=134–140° C. (bath temperature: 150–174° C.).

EXAMPLE 6

1.01 g. of crude manool mono-epoxide (prepared, e.g., in the manner described in Example 5) and 25 mg. of $OsO_4$ are dissolved in 30 ml. of pure dioxan and 10 ml. of water, and the solution is vigorously stirred for 10 minutes. Then, while stirring is continued, 4 g. of sodium meta-periodate are added within 30 minutes to the solution which has become dark violet. A voluminous precipitate consisting of sodium iodate soon starts to separate. After 2 hours' agitation, the reaction mixture is completely colorless. After working up of the reaction mixture, the reaction product will again become colored, and the above described oxidation reaction is repeated whereby an additional amount of 2 g. of sodium meta-periodate is used. The reaction mixture is extracted with ether, the ethereal extract is washed three times with 5% sodium bicarbonate, then three times with water, and dried over anhydrous sodium sulfate. After elimination of the ether, there are obtained 821 mg. of a dark-yellow oil having a sweet odor.

In order to obtain the epoxy-ketone in its pure form, the crude oil is subjected to chromatography on 30 times its weight of neutral alumina (activity II). Then, one first eluates with a mixture of petroleum ether/benzene 3:1 and thereafter with a mixture of benzene/ethyl acetate 1:1. The epoxy-ketone is to be found in the fractions of the mixture benzene/ethyl acetate. Evaporation of the solvents yields the epoxy-ketone in pure form, M.P. 33–34° C., after recrystallization from cold petroleum ether.

EXAMPLE 7

28.3 g. (92.5 millimoles) of crude manool mono-epoxide (prepared, e.g., in the manner described in Example 5), 840 ml. of purified dioxan, 280 ml. of water and 700 mg. (2.75 millimoles) of $OsO_4$ are admixed in a flask of 2000 ml. equipped with a mechanical agitator. The mixture is stirred at room temperature. After 15 minutes the liquid has turned dark, and 112 g. (520 millimoles) of sodium meta-periodate are added within 45 minutes in portions while vigorously stirring. A sodium iodate precipitate is formed. Agitation of the reaction mixture is continued for 4 hours at room temperature, then for one hour at 35° C.

The reaction mixture is filtered and the sodium iodate precipitate (78.5 g.) is rinsed with ether. The filtrate is concentrated without any heat in vacuo, the residue is taken up in water and twice extracted with ether. The ethereal phase is washed three times with 5% sodium bicarbonate, then three times with water. After drying of the extract over sodium sulfate and elimination of the ether, there are obtained 22.8 g. (88%) of crude epoxy-ketone in the form of a black viscous oil. This crude product can be used directly for the ketalization reaction.

EXAMPLE 8

1.78 g. of crude manool mono-epoxide (prepared, e.g., in the manner described in Example 5) are dissolved in 200 ml. of absolute ether, and to the solution are added 200 ml. of pyridine and then 2.5 g. of $OsO_4$. The reaction mixture is allowed to stand in the dark for 72 hours at room temperature. The reaction mixture is concentrated, and the pyridine is removed from the formed osmic complex by the addition of benzene and by concentrating again, this operation being repeated several times. The dried osmic complex and 20 g. of mannitol are dissolved in 500 ml. of 2 N caustic soda, 360 ml. of ethanol and 200 ml. of benzene, and the solution is refluxed for four hours. The reaction mixture is saturated with NaCl and the mixture extracted with ether. After water-washing of the ethereal extract and elimination of the ether, there are obtained 1.92 g. of a yellow oil which slowly crystallizes when hexane is added thereto. Recrystallization of this product from a mixture of methylene chloride/hexane yields 1.31 g. of the epoxy-triol in the form of colorless crystals, M.P. 113–114° C. For analysis purposes, a sample of the epoxy-triol is recrystallized several times from a mixture of methylene chloride/hexane. The melting point becomes constant at 119° C.; $[\alpha]_D^{20}$=+10° (c.=1.13, $CHCl_3$).

*Analysis.*—$C_{20}H_{36}O_4$—Calculated: C=70.54%; H=10.66%. Found: C=70.74%; H=10.77%.

200 mg. of the epoy-triol (F. 113–114° C.) are dissolved in 65 ml. of methanol and 6 ml. of pyridine, and there is added thereto a solution of 1.1 g. of periodic acid in 5 ml. of water. The reaction mixture is allowed to stand for 45 minutes at room temperature. The solvents are removed and the residue extracted with ether. After washing of the ethereal extract and elimination of the ether, there are obtained 165 mg. of a colorless oil. This product is purified by chromatography in the manner described in Example 6 to thus obtain the epoxy-ketone, M.P. 33–34° C.

EXAMPLE 9

860 mg. of crude epoxy-ketone (prepared, e.g., in the manner described in Example 7) are disolved in 100 ml. of absolute benzene, and, after addition of 50 mg. of p-toluene-sulfonic acid, the solution is refluxed for five hours. The reaction mixture is concentrated and the residue extracted with ether. The ethereal extract is washed with aqueous sodium bicarbonate and then with water. After drying and evaporation of the ether, there are obtained 851 mg. of a dark oil. This oil is subjected to chromatography on 25 g. of alumina (activity II) by using petroleum ether as the eluant. By evaporation of the solvent there are obtained 386 mg. of a crystalline product, M.P. 109–110° C. $[\alpha]_D^{20}=+6.5°$. This product is a mixture composed of about 38% of ketal XI and about 62% of iso-ketal XII.

EXAMPLE 10

4.9 g. of a mixture of crude ketals prepared by heating the epoxy-ketone with p-toluene-sulfonic acid in benzene (e.g., in the manner described in Example 9) are subjected to chromatography on 250 g. of neutral alumina (activity II) by using petroleum ether as the eluant. The ketals are eluted in the following succession: iso-ketal XII—mixture of the two ketals—ketal XI. The ketals are recrystallized from hexane by cooling to −20° C. There are thus obtained the iso-ketal XII and the ketal XI in pure form in proportions of about 70–75% and 25–30%, respectively.

Iso-ketal XII: M.P.=121–122° C.; $[\alpha]_D^{29}=-9°$ c.=1.09, CHCl$_3$)
Ketal XI: M.P.=115–116° C. (determined under microscope with heated plate); $[\alpha]_D^{20}=+31°$ (c.=1.08, CHCl$_3$)

The following examples indicate perfume compositions containing each an internal ketal according to the present invention:

EXAMPLE 11

| | Parts |
|---|---|
| Internal ketal of the Formula XI (C$_{18}$H$_{30}$O$_2$) | 6 |
| Dimethyl-benzyl-carbinyl acetate | 30 |
| Cyclosia base | 35 |
| Synthetic geraniol, C.P | 50 |
| Iralia | 85 |
| Linalol extra | 20 |
| Santalol, C.P | 50 |
| Framboise 2222 | 60 |
| Patchouli | 30 |
| Essence of Styrax | 20 |

The woody-fruity note of this composition is made warmer and more penetrating by the presence of the ketal.

EXAMPLE 12

| | Parts |
|---|---|
| Internal ketal of the formula XII (C$_{18}$H$_{30}$O$_2$) | 4 |
| Exaltolide | 2 |
| Musk ketone | 6 |
| Vanillin | 1 |
| Linalyl acetate extra | 8 |
| α-Amylcinnamic aldehyde | 7 |
| C$_{10}$ aldehyde (n-decanal), 10% | 3 |
| C$_{11}$ aldehyde (n-undecanal), 10% | 4 |
| Cyclosia base | 14 |
| Iralia | 9 |
| Iso-eugenol extra | 8 |
| Balsamol | 40 |
| Corinal | 10 |
| Parmantheme | 2 |
| Wardia | 8 |
| Patchouli | 9 |
| Java vetiver | 5 |

This fancy composition has a flowery, very rising note, with a tenacious background.

It may be advantageous to use a mixture of the stereo-isomeric ketals instead of the individual isomers because the latter may cause anosmia whereas mixtures of the isomers have a much less pronounced tendency to cause this phenomenon.

What we claim is:

1. The polycyclic internal ketal of the formula

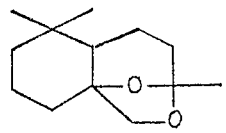

2. The polycyclic internal ketal of the formula

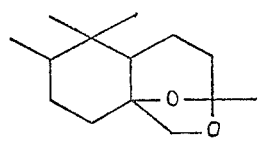

3. A compound selected from the group consisting of the substances having the formulae

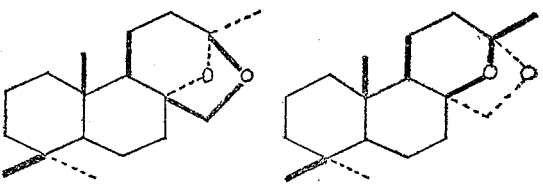

and mixtures thereof.

4. The compound of the formula

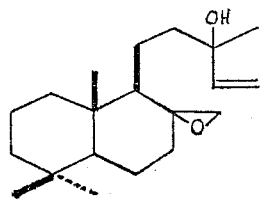

5. The compound of the formula

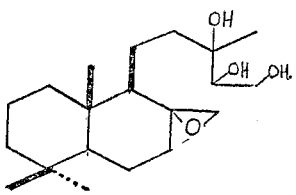

6. The compound of the formula

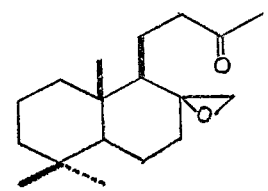

7. A process which comprises reacting manool with perbenzoic acid in an inert organic diluent at a temperature not exceeding 10° C. in order to convert the manool into its mono-epoxide, converting the 3-hydroxy-3-vinylbutyl-1 group of the resulting manool mono-epoxide into a 3-oxo-butyl-1 group by reacting said manool mono-epoxide with an alkali metal periodate in aqueous dioxan in the presence of a catalyst selected from the group consisting of osmium tetroxide and potassium permanganate, and cyclizing the resulting epoxy-ketone by heating the latter in the presence of an acidic catalyst selected from the group consisting of sulfuric acid, boron trifluoride and p-toluene sulfonic acid in order to form a mixture of isomeric ketals having the formulae

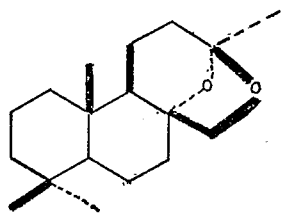

and

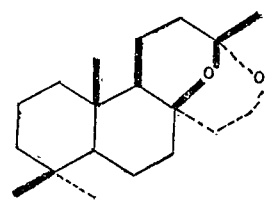

8. A process which comprises reacting manool with perbenzoic acid in an inert organic diluent at a temperature not exceeding 10° C. in order to convert the manool into its mono-epoxide, converting the 3-hydroxy-3-vinyl-butyl-1 group of the resulting manool mono-epoxide into a 3-oxo-butyl-1 group by reacting said mono-epoxide with osmium tetroxide in an anhydrous mixture of ether and pyridine, decomposing the resulting osmic complex of manool mono-epoxide by means of an agent selected from the group consisting of sodium sulfite, sodium bisulfite, hydrogen sulfide and mannitol plus caustic soda, and reacting the resulting epoxy-triol of the formula

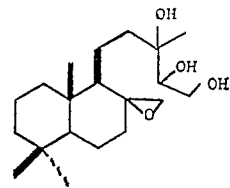

with an agent selected from the group consisting of periodic acid and its alkali metal salts, and cyclizing the resulting epoxy-ketone by heating the latter in the presence of an acidic catalyst selected from the group consisting of sulfuric acid, boron trifluoride and p-toluene sulfonic acid in order to form a mixture of isomeric ketals having the formulae

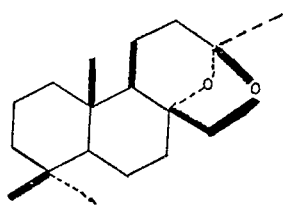

and

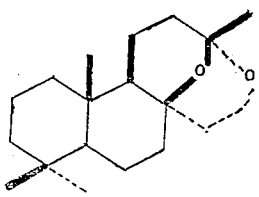

9. The process of claim 8 in which the epoxy-triol is reacted with an agent selected from the group consisting of periodic acid and its alkali metal salts in the presence of methanol and pyridine.

References Cited in the file of this patent

Hosking: "Berichte," vol. 69, page 785, (1936).
Schenk et al.: "Helv. Chim. Acta," vol. 35, pages 817–24 (1952).
Schenk et al.: "Helv. Chim. Acta," vol. 37, pages 543–6 (1954).

UNITED STATES PATENT OFFICE
CERTIFICATE OF CORRECTION

Patent No. 3,144,465                            August 11, 1964

Leopold Ruzicka et al.

It is hereby certified that error appears in the above numbered patent requiring correction and that the said Letters Patent should read as corrected below.

Column 8, line 64, for "70.74%" read -- 70.47% --; line 65, for "epoy-triol" read -- epoxy-triol --.

Signed and sealed this 9th day of February 1965.

(SEAL)
Attest:

ERNEST W. SWIDER                          EDWARD J. BRENNER
Attesting Officer                            Commissioner of Patents